United States Patent [19]

Eckert

[11] 4,358,565
[45] Nov. 9, 1982

[54] LUBE OIL ADDITIVE

[75] Inventor: Rudolf J. A. Eckert, Amsterdam, Netherlands

[73] Assignee: Shell Oil Company, Houston, Tex.

[21] Appl. No.: 203,073

[22] Filed: Oct. 31, 1980

[30] Foreign Application Priority Data

Nov. 16, 1979 [GB] United Kingdom ............... 7939785

[51] Int. Cl.$^3$ .................. C08F 255/02; C10M 1/32; C10M 3/26; C10M 5/20
[52] U.S. Cl. .................. 525/280; 525/279; 525/281; 252/50; 252/51.5 R
[58] Field of Search .............. 525/280, 279, 281; 252/50, 51.5 R

[56] References Cited

U.S. PATENT DOCUMENTS

| | | | |
|---|---|---|---|
| 3,763,044 | 10/1973 | Anderson | 252/59 |
| 3,772,196 | 11/1973 | St. Clair et al. | 252/32.7 E |
| 3,864,268 | 2/1975 | Culbertson et al. | 252/51.5 R |
| 4,077,893 | 3/1978 | Kiovsky | 252/56 R |
| 4,116,917 | 9/1978 | Eckert | 260/33.6 A Q |
| 4,141,847 | 2/1979 | Kiovsky | 252/51.5 A |
| 4,281,081 | 7/1981 | Jost et al. | 252/51.5 A |
| 4,282,132 | 8/1981 | Benda et al. | 252/51.5 A |

FOREIGN PATENT DOCUMENTS 8327 3/1980 European Pat. Off. ............ 525/280

*Primary Examiner*—William F. Hamrock
*Attorney, Agent, or Firm*—Dean F. Vance

[57] ABSTRACT

A modified hydrogenated star-shaped polymer comprising a nucleus, e.g., divinylbenzene, with polymeric arms linked to it is prepared by grafting a hydrogenated star-shaped polymer with a nitrogen-containing polymerizable polar organic compound, e.g., 2-vinylpyridine or 4-vinylpyridine. Such polymers are useful as viscosity index improvers for lube oil compositions, and also possess dispersancy.

12 Claims, No Drawings

LUBE OIL ADDITIVE

BACKGROUND OF THE INVENTION

1. Field of the Invention

This invention relates generally to polymeric additives for lubricating oil compositions. More particularly, this invention relates to a lube oil additive having both viscosity index improving and dispersancy properties.

2. The Prior Art

The newer engines place increased demands on the lubricants to be employed. In the past a number of different additives have been added to lubricating oils to improve such properties as viscosity index and dispersancy. One such additive added to lubricating oils to improve viscosity index is a two-block copolymer having the general configuration A-B where A is styrene and B is hydrogenated isoprene. See generally U.S. Pat. Nos. 3,763,044 and 3,772,196. A VI improver having greatly improved mechanical shear stability is the selectively hydrogenated star-shaped polymer disclosed in U.S. Pat. No. 4,166,917 by Rudolf J. Eckert, entitled "Hydrogenated Star-Shaped Polymer". Significant reductions in cost can be made by employing a single additive that improves a number of lubricant properties. However, in attempting to improve more than a single lubricant property, care must be taken in not causing the deterioration of other properties. For example, by employing an oxidation step to attach polar groups to the polymer backbone in U.S. Pat. No. 3,864,268, the patentees have reduced lubricant stability by introducing cites for oxidative attack.

From U.S. Pat. Nos. 4,077,893 and 4,141,847 hydrogenated star-shaped polymers are known which have been modified resulting in products which possess both dispersant and viscosity index-improving properties when used as additives in lubricating oils. These products are prepared by reacting in a first step a selectively hydrogenated star-shaped polymer comprising a nucleus and outwardly extending arms of polymers or copolymers of dienes and monoalkenyl arenes with an alpha beta unsaturated carboxylic acid or derivative, and then reacting in a second step the resulting intermediate with an alkane polyol, e.g., pentaerythritol or a polyamine. However, the polymer preparation process according to the above two patents requires multiple processing steps which greatly increase the cost of the additive along with introducing possible problems with the resulting polymers.

SUMMARY OF THE INVENTION

The present invention relates to an ashless, oil-soluble additive having both dispersant and viscosity-index (VI) improving properties. The claimed additive is a modified hydrogenated star-shaped polymer comprising a nucleus and polymeric arms linked to said nucleus wherein said arms are selected from the group consisting of:
  (i) hydrogenated homopolymers and hydrogenated copolymers of conjugated dienes;
  (ii) hydrogenated copolymers of conjugated dienes and monoalkenyl arenes; and
  (iii) mixtures thereof;
and wherein at least about 80% of the aliphatic unsaturation of the star-shaped polymer has been reduced by hydrogenation while less than 20% of the aromatic unsaturation has been reduced; and which star-shaped polymer has been grafted with nitrogen containing polymerizable organic polar compounds. "Grafted", as referred to above, means a reaction of the star-shaped polymer with polymerizable polar monomers catalyzed by a free radical polymerization initiator such as tertiary butyl hydroperoxide or t-butylbenzoate. The star-shaped polymer to be grafted comprises polymeric arms linked to a nucleus. The nucleus is suitably formed by polyalkenyl coupling agents. Such agents are known from U.S. Pat. No. 4,077,893 and U.S. Pat. No. 4,116,917. They may be aliphatic, aromatic or heterocyclic.

Also claimed is a process for preparing a dispersant-/VI improver comprising reacting a selectively hydrogenated star-shaped polymer with a nitrogen containing polymerizable organic polar compound at a temperature of about 70° C. to about 180° C. and at a pressure of from 1 bar to 50 bar in an inert atmosphere wherein said star-shaped polymer comprises a poly (polyalkenyl coupling agent) nucleus, and at least four polymeric arms linked to said nucleus wherein said polymeric arms are selected from the group consisting of:
  (i) hydrogenated homopolymers and hydrogenated copolymers of conjugated dienes;
  (ii) hydrogenated copolymers of conjugated dienes and monoalkenyl arenes; and
  (iii) mixtures thereof;
and wherein at least about 80% of the alphatic unsaturation of the star-shaped polymer has been reduced by hydrogenation while less than 20% of the aromatic unsaturation has been reduced.

The dispersant VI improvers of the present invention possess excellent viscosity improving properties, oxidative stability, mechanical shear stability, and dispersancy.

DETAILED DESCRIPTION OF THE INVENTION

1. Preparation of the Base Polymer—The base polymer employed in making the present dispersant VI improvers is a star polymer. These polymers are generally produced by the process comprising the following reaction steps:
  (a) polymerizing one or more conjugated dienes and, optionally, one or more monoalkenyl arene compounds, in solution, in the presence of an ionic initiator to form a living polymer;
  (b) reacting the living polymer with a polyalkenyl coupling agent to form a star-shaped polymer; and
  (c) hydrogenating the star-shaped polymer to form a hydrogenated star-shaped polymer.

The living polymers produced in reaction step (a) of the present process are the precursors of the hydrogenated polymer chains which extend outwardly from the poly(polyalkenyl coupling agent) nucleus.

As is well-known, living polymers may be prepared by anionic solution polymerization of conjugated dienes and, optionally, monoalkenyl arene compounds in the presence of an alkali metal or an alkali-metal hydrocarbon, e.g., sodium naphthalene, as anionic initiator. The preferred initiator is lithium or a monolithium hydrocarbon. Suitable lithium hydrocarbons include unsaturated compounds such as allyl lithium, methallyl lithium; aromatic compounds such as phenyllithium, the tolyllithiums, the xylyllithiums and the naphthyllithiums and in particular the allyl lithiums such as methyllithium, ethyllithium, propyllithium, butyllithium, amyllithium, hexyllithium, 2-ethylhexyllithium and n-hexadecyllithium. Secondary-butyllithium is the preferred initiator. The initiators may be added to the polymerization mixture in two or more stages optionally together with additional monomer. The living polymers are olefinically and, optionally, aromatically unsaturated.

The living polymers obtained by reaction step (a), which are linear unsaturated living polymers, are prepared from one or more conjugated dienes, e.g., $C_4$ to $C_{12}$ conjugated dienes and, optionally, one or more monoalkenyl arene compounds.

Specific examples of suitable conjugated dienes include butadiene (1,3-butadiene); isoprene, 1,3-pentadiene (piperylene); 2,3-dimethyl-1,3-butadiene; 3-butyl-1,3-octadiene, 1-phenyl-1,3-butadiene; 1,3-hexadiene; and 4-ethyl-1,3-hexadiene with butadiene and/or isoprene being preferred. Apart from the one or more conjugated dienes the living polymers may also be partly derived from one or more monoalkenyl arene compounds. Preferred monoalkenyl arene compounds are the monovinyl aromatic compounds such as styrene, monovinylnaphthalene as well as the alkylated derivatives thereof such as o-, m- and p-methylstyrene, alpha-methylstyrene and tertiary-butylstyrene. Styrene is the preferred monoalkenyl arene compound. If a monoalkenyl arene compound is used in the preparation of the living polymers it is preferred that the amount thereof be below about 50% by weight, preferably about 3 to about 50%.

The living polymers may be living homopolymers, living copolymers, living terpolymers, living tetrapolymers, etc. The living homopolymers may be represented by the formula A—M, wherein M is a ionic group, e.g., lithium, and A is polybutadiene or polyisoprene. Living polymers of isoprene are the preferred living homopolymers. The living copolymers may be represented by the formula A—B—M, wherein A—B is a block, random or tapered copolymer such as poly(butadiene/isoprene) poly(butadiene/styrene) or poly(isoprene/styrene). Such formulae, without further restriction, do not place a restriction on the arrangement of the monomers within the living polymers. For example, living poly(isoprene/styrene) copolymers may be living polyisoprene-polystyrene block copolymers, living polystyrene-polyisoprene block copolymers, living poly(isoprene/styrene) random copolymers, living poly(isoprene/styrene) tapered copolymers or living poly(isoprene/styrene/isoprene) block copolymers. As an example of a living terpolymer may be mentioned living poly(butadiene/styrene/isoprene) terpolymers.

As stated above, the living copolymers may be living block copolymers, living random copolymers or living tapered copolymers. The living block copolymers may be prepared by the step-wise polymerization of the monomers, e.g., by polymerizing isoprene to form living polyisoprene followed by the addition of the other monomer, e.g., styrene, to form a living block copolymer having the formula polyisoprene-polystyrene-M, or styrene may be polymerized first to form living polystyrene followed by addition of isoprene to form a living block copolymer having the formula polystyrene-polyisoprene-M.

The living random copolymers may be prepared by adding gradually the most reactive monomer to the polymerization reaction mixture, comprising either the less reactive monomer or a mixture of the monomers, in order that the molar ratio of the monomers present in the polymerization mixture be kept at a controlled level. It is also possible to achieve this randomization by gradually adding a mixture of the monomers to be copolymerized to the polymerization mixture. Living random copolymers may also be prepared by carrying out the polymerization in the presence of a so-called randomizer. Randomizers are polar compounds which do not deactivate the catalyst and bring about a tendency to random copolymerization. Suitable randomizers are tertiary amines, such as trimethylamine, triethylamine, dimethylethylamine, tri-n-propylamine, tri-n-butylamine, dimethylaniline, pyridine, quinoline, N-ethylpiperidine, N-methylmorpholine; thioethers, such as dimethyl sulphide, diethyl sulphide, di-n-propyl sulphide, di-n-butyl sulphide, methyl ethyl sulphide; and in particular ethers, such as dimethyl ether, methyl ethyl ether, diethyl ether, di-n-propyl ether, di-n-butyl ether, di-octyl ether, di-benzyl ether, di-phenyl ether, anisole 1,2-dimethoxyloxyethane, o-dimethoxy benzene, and cyclic ethers such as tetrahydrofuran.

Living tapered copolymers are prepared by polymerizing a mixture of monomers and result from the difference in reactivity between the monomers. For example, if monomer A is more reactive than monomer B then the composition of the copolymer gradually changes from that of nearly pure poly-A to that of nearly pure poly-B. Therefore, in each living copolymer molecule three regions can be discerned, which gradually pass into each other, and which have no sharp boundaries. One of the outer regions consists nearly completely of units derived from monomer A and contains only small amounts of units derived from monomer B, in the middle region the relative amount of units derived from monomer B greatly increases and the relative amount of units derived from monomer A decreases, while the other outer region consists nearly completely of units derived from monomer B and contains only small amounts of units derived from monomer A. Living tapered copolymers of butadiene and isoprene are preferred living tapered polymers.

Since the living polymers produced in reaction step (a) of the above process are the precursors of the hydrogenated polymer chains which extend outwardly from the poly(polyalkenyl coupling agent)nucleus, it can be seen that the preferred hydrogenated polymer chains are hydrogenated polybutadiene chains, hydrogenated polyisoprene chains, hydrogenated poly(butadiene/isoprene)chains, hydrogenated poly(butadiene/styrene)-chains and hydrogenated poly(isoprene/styrene)chains.

The solvents in which the living polymers are formed are inert liquid solvents such as hydrocarbons, e.g., aliphatic hydrocarbons, such as pentane, hexane, heptane, octane, 2-ethylhexane, nonane, decane, cyclohexane, methylcyclohexane or aromatic hydrocarbons, e.g., benzene, toluene, ethylbenzene, the xylenes, diethylbenzenes, propylbenzenes. Cyclohexane is preferred. Mixtures of hydrocarbons, e.g., lubricating oils may also be used.

The temperature at which the polymerization is carried out may vary between wide limits such as from −50° to 150° C., preferably from about 20° to about 80° C. The reaction is suitably carried out in an inert atmosphere such as nitrogen and may be carried out under pressure, e.g., a pressure of from about 0.5 to about 10 bars.

The concentration of the initiator used to prepare the living polymer may also vary between wide limits and is determined by the desired molecular weight of the living polymer.

The molecular weight of the living polymers prepared in reaction step (a) may vary between wide limits. Suitable number average molecular weights are from about 5,000 to about 150,000 with number average molecular weights of from about 15,000 to about 100,000 being preferred. Consequently, the number average molecular weight of the hydrogenated polymer chains of the final star-shaped polymer may also vary between these limits.

The living polymers produced in reaction step (a) are then reacted, in reaction step (b), with a polyalkenyl coupling agent. Polyalkenyl coupling agents capable of forming star-shaped polymers are known. See generally, Fetters et al., U.S. Pat. No. 3,985,830; Milkovich, Canadian Pat. No. 716,645; and British Pat. No. 1,025,295. They are usually compounds having at least two non-conjugated alkenyl groups. Such groups are usually attached to the same or different electron withdrawing groups, e.g., an aromatic nucleus. Such compounds have the property that at least two of the alkenyl groups are capable of independent reaction with different living polymers and in this respect are different from conventional conjugated diene polymerizable monomers such as butadiene, isoprene, etc. Pure or technical grade polyalkenyl coupling agents may be used. Such compounds may be aliphatic, aromatic or heterocyclic. Examples of aliphatic compounds include the polyvinyl and polyallyl acetylenes, diacetylenes, phosphates and phosphites as well as the dimethacrylates, e.g., ethylene dimethacrylate. Examples of suitable heterocyclic compounds include divinyl pyridine and divinyl thiophene. The preferred coupling agents are the polyalkenyl aromatic compounds and the most preferred are the polyvinyl aromatic compounds. Examples of such compounds include those aromatic compounds, e.g., benzene, toluene, xylene, anthracene, naphthalene and durene which are substituted by at least two alkenyl groups preferably directly attached thereto. Examples include the polyvinyl benzenes, e.g., divinyl, trivinyl and tetravinyl benzenes; divinyl, trivinyl and tetravinyl ortho-, meta- and para-xylenes, divinyl naphthalene, divinyl ethyl benzene, divinyl biphenyl, diisobutenyl benzene, diisopropenyl benzene and diisopropenyl biphenyl. The preferred aromatic compounds are represented by the formula: $A(CH=CH_2)_x$ wherein A is an optionally substituted aromatic nucleus and x is an integer of at least 2. Divinyl benzene, in particular meta-divinyl benzene, is the most preferred aromatic compound. Pure or technical grade divinylbenzene (containing various amounts of other monomers, e.g., styrene and ethyl styrene) may be used. The coupling agents may be used in admixture with small amounts of added monomers which increase the size of the nucleus, e.g., styrene or alkylated styrene. In this case, the nucleus may be described as a poly(dialkenyl coupling agent/monoalkenyl aromatic compound)nucleus, e.g., a poly(divinylbenzene/monoalkenyl aromatic compound)nucleus. From the above it will be clear that the term divinylbenzene when used to describe the nucleus means either purified or technical grade divinyl benzene.

The polyalkenyl coupling agent should be added to the living polymer after the polymerization of the monomers is substantially complete, i.e., the agent should only be added after substantially all of the monomer has been converted to living polymers.

The amount of polyalkenyl coupling agent added may vary between wide limits but preferably at least 0.5 mole is used per mole of unsaturated living polymer. Amounts of from 1 to 15 moles, preferably from 1.5 to 5 moles are preferred. The amount, which may be added in two or more stages, is usually such so as to convert at least 80 or 85%w of the living polymers into star-shaped polymers.

The reaction step (b) may be carried out in the same solvent as for reaction step (a). A list of suitable solvents is given above. The reaction step (b) temperature may also vary between wide limits, e.g., from 0° to 150° C., preferably from 20° to 120° C. The reaction may also take place in an inert atmosphere, e.g., nitrogen and under pressure, e.g., a pressure of from 0.5 to 10 bars.

The star-shaped polymers prepared in reaction step (b) are characterized by having a dense center or nucleus of cross-linked poly(polyalkenyl coupling agent) and a number of arms of substantially linear unsaturated polymers extending outwardly therefrom. The number of arms may vary considerably but is typically between 4 and 25, preferably from about 5 to about 15, most preferred from 5 to 10 arms. Star-shaped homopolymers may be represented by the formula $A-x(A)_n$ and star-shaped copolymers may be represented by the formula $A-B-x(B-A)_n$ wherein n is an integer, usually between 3 and 24 and x is the poly(polyalkenyl coupling agent)nucleus. From the above it can be seen that x is preferably a poly(polyvinyl aromatic coupling agent)nucleus and more preferably a poly(divinylbenzene)-nucleus. As stated above it is believed that the nuclei are cross-linked.

It has been found that the greater number of arms employed in the instant invention significantly improve both the thickening efficiency and the shear stability of the polymer since it is then possible to prepare a VI improver having a high molecular weight (resulting in increased thickening efficiency) without the necessity of excessively long arms (resulting in improved shear stability).

Such star-shaped polymers, which are still "living," may then be deactivated or "killed," in known manner, by the addition of a compound which reacts with the carbanionic end group. As examples of suitable deactivators may be mentioned, compounds with one or more active hydrogen atoms such as water, alcohols (e.g., methanol, ethanol, isopropanol, 2-ethylhexanol) or carboxylic acids (e.g., acetic acid), compounds with one active halogen atom, e.g., a chlorine atoms (e.g., benzyl chloride, chloromethane), compounds with one ester group and carbon dioxide. If not deactivated in this way, the living star-shaped polymers will be killed by the hydrogenation step (c).

However, before being killed, the living star-shaped polymers may be reacted with further amounts of monomers such as the same or different dienes and/or monoalkenyl arene compounds of the types discussed above. The effect of this additional step, apart from increasing the number of polymer chains, is to produce a further living star-shaped polymer having at least two different types of polymer chains. For example, a living star-shaped polymer derived from living polyisoprene may be reacted with further isoprene monomer to produce a further living star-shaped polymer having polyisoprene chains of different number average molecular weights. Alternatively, the living star-shaped polyisoprene homopolymer may be reacted with styrene monomer to produce a further living star-shaped copolymer having both polyisoprene and polystyrene homopolymer chains. Thus it can be seen that by different polymer chains is meant chains of different molecular weights and/or chains of different structures. These further polymerizations may take place under substantially the same conditions as described for reaction step (a) of the process. The additional chains may be homopolymer, copolymer chains, etc., as described above.

The molecular weights of the star-shaped polymer to be hydrogenated in reaction step (c) may vary between relatively wide limits. However, an important aspect of the present invention is that polymers possessing good shear stability may be produced even though the polymers have very high molecular weights. It is possible to produce star polymers having peak molecular weights between about 25,000 and about 150,000. Preferred molecular weights are 100,000 to 500,000. These peak molecular weights are determined by gel permeation chromotography (GPC) on a polystyrene scale.

In step (c), the star-shaped polymers are hydrogenated by any suitable technique. Suitably at least 80%, preferably 90 to about 98% of the original olefinic unsaturation is hydrogenated. If the star-shaped polymer is partly derived from a monoalkenyl arene compound, then the amount of aromatic unsaturation which is hydrogenated, if any, will depend on the hydrogenation conditions used. However, preferably less than 20%, more preferably less than 5% of such aromatic unsaturation is hydrogenated. If the poly(polyalkenyl coupling agent)nucleus is a poly(polyalkenyl aromatic coupling agent)nucleus, then the aromatic unsaturation of the nucleus may or may not be hydrogenated again depending upon the hydrogenation conditions used. The molecular weights of the hydrogenated star-shaped polymers correspond to those of the unhydrogenated star-shaped polymers.

The hydrogenation can be carried out in any desired way. A hydrogenation catalyst may be used, e.g., a copper or molybdenum compound. Compounds containing noble metals or noble-metal compounds can be used as hydrogenation catalysts. Preference is given to catalysts containing a non-noble metal or a compound thereof of Group VIII of the Periodic Table, i.e., iron, cobalt and in particular, nickel. As examples may be mentioned, Raney nickel and nickel on kieselguhr. Special preference is given to hydrogenation catalysts which are obtained by causing metal hydrocarbyl compounds to react with organic compounds of any one of the group VIII metals iron, cobalt or nickel, the latter compounds containing at least one organic compound which is attached to the metal atom by means of an oxygen atom, for instance as described in U.K patent specification No. 1,030,306. Preference is given to hydrogenation catalysts obtained by causing an aluminum trialkyl (e.g., aluminum triethyl (Al(Et)$_3$) or aluminum triisobutyl) to react with a nickel salt of an organic acid (e.g., nickel diisopropyl salicylate, nickel naphthenate, nickel 2-ethyl hexanoate, nickel di-tert-butyl benzoate, nickel salts of saturated monocarboxylic acids obtained by reaction of olefins having from 4 to 20 carbon atoms in the molecule with carbon monoxide and water in the presence of acid catalysts) or with nickel enolates or phenolates (e.g., nickel acetonylacetonate or the nickel salt of butylacetophenone).

The hydrogenation of the star-shaped polymer is very suitably conducted in solution in a solvent which is inert during the hydrogenation reaction. Saturated hydrocarbons and mixtures of saturated hydrocarbons are very suitably and it is of advantage to carry out the hydrogenation in the same solvent in which the polymerization has been effected.

A much preferred hydrogenation process is the selective hydrogenation process shown in Wald et al., U.S. Pat. No. 3,595,942. In that process, hydrogenation is conducted, preferably in the same solvent in which the polymer was prepared, utilizing a catalyst comprising the reaction product of an aluminum alkyl and a nickel or cobalt carboxylate or alkoxide. A favored catalyst is the reaction product formed from triethyl aluminum and nickel octoate.

The hydrogenated star-shaped polymer is then typically recovered in solid form from the solvent in which it is hydrogenated by any convenient technique such as by evaporation of the solvent. Alternatively, an oil, e.g., a lubricating oil, may be added to the solution and the solvent stripped off from the mixture so formed to produce concentrates. Easily handleable concentrates are produced even when the amount of hydrogenated star-shaped polymer therein exceeds 10%w. Suitable concentrates contain from 10 to 25%w of the hydrogenated star-shaped polymer. Still further, if desired the polymer may be retained in its present solution for the next step in the process.

2. Introduction of Sites for Dispersant Activity—The selectively hydrogenated star polymers as prepared above do not have adequate dispersancy characteristics by themselves. Therefore, the base polymer must be derivatized or grafted as explained below.

The selectively hydrogenated star polymers are reacted with a nitrogen containing polymerizable organic polar compound at a temperature of about 70° C. to about 180° C. and at a pressure of from about 1 bar to about 50 bar in an inert atmosphere, such as a nitrogen atmosphere. The reaction is catalyzed by a free radical polymerization initiator such as tertiary butyl hydroperoxide or t-butylperbenzoate. Suitably the grafting reaction is carried out in solvents which have a very low reactivity towards free radicals, e.g., dichlorobenzene, benzene and cyclohexane. Cyclohexane is preferably used.

The organic polar compound is preferably a polymerizable nitrogen containing heterocyclic compound selected from the group consisting of piperidine, morpholine, piperazine, pyridine, pyrrolidine, pyrrole, benzopyrrole, quinoline, indole which are all alkenylsubstituted and 2-methyl vinylpyridine and N-vinylimidazole. Of the polar compounds 2-vinylpyridine and 4-vinylpyridine are most preferred.

The reaction product of this invention can be incorporated in lubricating oil compositions, e.g., automotive crankcase oils, in concentrations within the range of about 0.1 to about 15, preferably about 0.1 to 3, weight percent based on the weight of the total compositions. The lubricating oil to which the additives of the invention can be added include not only mineral lubricating oils, but synthetic oils also. Synthetic hydrocarbon lubricating oils may also be employed, as well as non-hydrocarbon synthetic oil including dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, etc. When used in gasoline or fuel oil, e.g., diesel fuel, No. 2 fuel oil, etc., then usually about 0.001 to 0.5 weight percent, based on the weight of the total composition of the reaction product will be used. Concentrations comprising a minor proportion, e.g., 15 to 45 weight percent, of said reaction product in a major amount of hydrocarbon diluent, e.g., 85 to 55 weight percent mineral lubricating oil, with or without other additives present, can also be prepared for ease of handling.

In the above compositions or concentrates, other conventional additives may also be present, including dyes, pour point depressants, antiwear agents, e.g., tricresyl phosphate, zinc dialkyl dithiophosphates of 3 to 8 carbon atoms, antioxidants such as phenyl-alpha-naphthylamine, tert-octylphenol sulfide, bis-phenols such as 4,4′-methylene bis(3,6-ditert-butylphenol), viscosity index improvers such as the ethylene-higher olefin copolymer, polymethylacrylates, polyisobutylene, alkyl fumaratevinyl acetate copolymers, and the like as well as other ashless dispersants or detergents such as overbased sulfonates.

The polymers are, because of, e.g., their excellent dispersancy performance, also suitably used in liquid hydrocarbon fuels, e.g., motor fuels. In this case generally lower levels of the present polymer than the above range will be used. Preferably the fuel comprises 0.001 to 0.1%w of the polymer.

The invention is further illustrated by means of the following Illustrative Embodiments, which are given for the purpose of illustration alone, and are not meant to limit the invention to the particular reactants and amounts disclosed.

Illustrative Embodiment I

This example describes the preparation of an oil-concentrate comprising 10%w of the polymer. A hydrogenated divinylbenzene coupled polyisoprene star-shaped polymer with arms having number average molecular weights of about 35,000 and wherein 99.4%w of the aliphatic unsaturation has been reduced was prepared according to the process as described in U.S. Pat. No. 4,077,893. This polymer was grafted with 2-vinylpyridine. A 5 liter stainless steel autoclave was charged with a solution consisting of 262 grams polymer, 26 grams 2-vinylpyridine and 2,300 grams cyclohexane. After replacing the air by nitrogen ($O_2 \leq 30$ ppm) and heating to 140° C., a solution of 3.1 grams of the radical initiator t-butylperbenzoate in 15 milliliters of cyclohexane was added applying $N_2$-pressure. Heating was continued for 6 hours. 2358 grams of H.V.I.—60 oil were added and the cyclohexane was distilled off in vacuo.

Illustrative Embodiment II

In order to compare the dispersant activity of the grafted polymer with that of the ungrafted or unreacted polymer a peptization test was carried out using the oil concentrate from Illustrative Embodiment I.

Results: 10 ppm of the grafted polymer were sufficient to give a dispersant effect whereas 350 ppm of the unreacted polymer were still not enough to provide a satisfactory result.

Illustrative Embodiment III

The viscometric properties of divinylbenzene coupled polyisoprene star-shaped polymer with a number average molecular weight of 35,000 per arm as mentioned in Illustrative Embodiment I grafted with 2 vinylpyridine as described in Illustrative Embodiment I was determined in oil blends containing 1.5%w of polymer, 10.1%w of a commercial H(eavy)D(uty) package, and 0.3%w of a pour point depressant in a H.V.I.-60 oil.
Results:

|  | $V_k$ 100° C. [cS] | $V_k$ 40° C. [cS] | $VI_E$ |
|---|---|---|---|
| base blend | 5.98 | 34.25 | 120 |
| base blend + grafted polymer | 16.25 | 104.5 | 168 |
| base blend + non-grafted polymer | 15.94 | 103.1 | 166 |

What is claimed is:

1. A modified hydrogenated star-shaped polymer comprising a poly-vinyl-aromatic nucleus and polymeric arms linked to said nucleus wherein said arms are selected from the group consisting of:
   (i) hydrogenated homopolymers and hydrogenated copolymers of conjugated dienes;
   (ii) hydrogenated copolymers of conjugated dienes and monoalkenyl arenes; and
   (iii) mixtures thereof;

and wherein at least about 80% of the aliphatic unsaturation of the star-shaped polymer has been reduced by hydrogenation while less than 20% of the aromatic unsaturation has been reduced; and which star-shaped polymer has been grafted with a nitrogen containing polymerizable organic polar compound selected from the group consisting of piperidine, morpholine, piperazine, pyridine, pyrrolidone, pyrrole, benzopyrrole, quinoline, indole which are all alkenyl substituted and 2-methyl vinylpyridine and N-vinyl imidazole in the presence of a free radical polymerization initiator and wherein the number average molecular weight of each of said polymeric arms is from 5,000 to 150,000.

2. The polymer as claimed in claim 1, wherein the nitrogen containing compound is 2-vinylpyridine or 4-vinylpyridine.

3. The polymer as claimed in claim 1 wherein the nucleus is a poly(divinylbenzene) nucleus.

4. The polymer as claimed in claim 3, wherein the nucleus is a poly(di-vinyl-benzene/monoalkenyl aromatic) nucleus.

5. The polymer as claimed in claim 1, wherein the number of polymeric arms is from 5 to 10.

6. The polymer as claimed in claim 1, wherein the number average molecular weight of the hydrogenated star-shaped polymer is from 25,000 to 1,500,000.

7. The polymer as claimed in claim 1, wherein each polymeric arm is a hydrogenated polyisoprene homopolymer.

8. A process for preparing a dispersant/VI improver comprising reacting a selectively hydrogenated star-shaped polymer with a nitrogen containing polymerizable organic polar compound in the presence of a free radical polymerization initiator at a temperature of about 70° C. to about 180° C. and at a pressure of from 1 bar to 50 bar in an inert atmosphere wherein said star-shaped polymer comprises a poly(poly-vinyl-aromatic coupling agent) nucleus, and at least four polymeric arms linked to said nucleus wherein said polymeric arms are selected from the group consisting of:
   (i) hydrogenated homopolymers and hydrogenated copolymers of conjugated dienes;
   (ii) hydrogenated copolymers of conjugated dienes and monoalkenyl arenes; and
   (iii) mixtures thereof;

and wherein at least about 80% of the aliphatic unsaturation of the star-shaped polymer has been reduced by hydrogenation while less than 20% of the aromatic unsaturation has been reduced, wherein said nitrogen compound is selected from the group consisting of piperidine, morpholine, piperazine, pyridine, pyrrolidone, pyrrole, benzopyrrole, quinoline, indole which are all alkenyl substituted and 2-methyl vinylpyridine and N-vinyl imidazole and wherein the number average molecular weight of each of said polymeric arms is from 5,000 to 150,000.

9. The process as in claim 8 wherein the inert atmosphere is a nitrogen atmosphere.

10. The process as in claim 8 wherein the reaction is carried out in cyclohexane.

11. A lubricating composition comprising a major amount of a lubricating oil and from 0.1 to about 15.0 weight percent of the oil-soluble product of claim 1.

12. A concentrated lubricating composition comprising a lubricating oil and from 15 to 45 weight percent of the oil-soluble produce to claim 1.

* * * * *